Patented Feb. 19, 1952

2,585,967

UNITED STATES PATENT OFFICE 2,585,967

WATER DISPERSIBLE DRY PREPARATIONS OF HARDENABLE BINDING AGENTS

Luzius Schibler, Basel, Switzerland, assignor to Ciba Limited, Basel, Switzerland, a Swiss firm No Drawing. Application February 17, 1948, Serial No. 9,026. In Switzerland March 21, 1947

9 Claims. (Cl. 260—6)

The present invention relates to stable dry preparations of hardenable binding agents and to a process for the manufacture thereof.

Copending application, Serial No. 783,844, filed November 3, 1947, describes a process for making stable aqueous emulsions of artificial resins, wherein a solution in a substantially water-immiscible solvent of a hardenable condensate from formaldehyde, a substance of amide character capable of forming a hardenable aminoplast with formaldehyde and a substantially water-immiscible alcohol, is emulsified in an aqueous solution which contains, in addition to at least one protein, at least one hydrotropic carbamide capable of forming a hardenable aminoplast with formaldehyde. These emulsions, which are of a weakly viscous to salve-like consistency, may be used as binding agents, adhesives, dressing agents or impregnating agents in the wood, paper, leather and textile industries, that is to say, for all purposes in which an adhesive or binding effect, which is resistant to water and, if desired, also to washing, is to be produced in a simple manner by means of a stable preparation.

The present invention is based on the unexpected observation that emulsions of the above kind can be converted by cautious removal of the liquid constituents into stable dry preparations, from which the user can produce in a simple manner products which are ready for use and have the desired consistency. These pulverulent preparations, as compared with the liquid or salve-like products, not only possess the advantage of a higher content of dry substance, but, as powders, are quite generally preferable for handling, packing, storage, etc.

According to this invention, therefore, a process for the manufacture of a stable dry preparation of a binding agent comprises cautiously evaporating to dryness an emulsion of a water-insoluble, hardenable condensate from formaldehyde, a substance of amide character which forms hardenable aminoplasts with formaldehyde and from a substantially water-immisicible alcohol, which emulsion has been obtained by emulsifying the condensate dissolved in a substantially water-immiscible solvent, in an aqueous solution which contains at least one hydrotropic carbamide which forms hardenable aminoplasts with formaldehyde and also contains at least one protein.

The emulsion of the hardenable condensate used as starting material contains at least two different solvents which must be removed by the drying process, namely water which serves as solvent for the protein and the hydrotropic carbamide and forms together with these latter substances the outer phase of the emulsion, and one or more organic solvents which are immiscible or only partially miscible with water and which, together with the hardenable condensate dissolved therein, constitute the inner disperse phase. It has been unexpectedly found that upon drying such an emulsion the disperse system as such is not destroyed. When the organic solvent is evaporated the hardenable condensate remains behind in a more or less dry, but still finely divided form, and a new dry disperse system is formed when the water is simultaneously evaporated. This system is easily dispersible in water, whereby the outer phase is re-formed without alteration and the particles of the hardenable condensate, practically freed from solvent, are apparently suspended in the now liquid system in the previously formed fine state of division. Obviously, when the dry preparation is dispersed or taken up in water, a small quantity of organic solvent may be added at the same time so that the more or less solid particles of the condensate can swell and at least partially redissolve. In this case emulsions are obtained which are of similar composition to the initial emulsions subjected to drying.

An important requirement for preparing usable dry preparations, that is to say, preparations which can be dispersed satisfactorily and are also capable of being hardened, is that the drying of the emulsion used as starting material should be so cautiously carried out as to suffice for volatilizing the solvents while still leaving the resinous condensate in a hardenable condition.

This can be achieved by evaporating the emulsion to dryness under reduced pressure. It is, however, also possible to carry out the drying process without the use of reduced pressure if care is taken to cool the material immediately after elimination of the solvents. Thus, besides drying under reduced pressure, there come into consideration drying on a drum dryer, in an atomising dryer, etc. Incompletely dry products are often distinctly thermoplastic and must first be cooled and then ground to powder. The drying is advantageously conducted in two stages. In the first stage the greater part of the solvents are removed and, if desired, recovered. As a rule the resulting products have insufficient capacity for being stored, because they easily agglomerate at raised temperatures. Therefore, they are advantageously further dried in a second stage under reduced pressure until they can be ground satisfactorily and the thermoplastic property has practically disappeared. Broadly speaking, any method of drying can be used which suffices to remove the liquid constituents while leaving substantially unaffected the hardening capacity of the condensate.

It is obvious that the method of drying should advantageously be chosen according to the properties and composition of the starting emulsion, and that the emulsion should be designed to a certain extent in accordance with the properties of the dry preparation. It is, however, a simple matter for a person skilled in the art to obtain preparations by the process of the invention which fulfil particular requirements by a suitable choice of the starting emulsions and the drying conditions.

The emulsions used as starting materials are made by the process described in the specification hereinbefore referred to.

As substances of amide character capable of forming hardenable aminoplasts with formaldehyde and used for preparing the hardenable condensate, which are insoluble in water and soluble in organic solvents, there come into consideration urea, thiourea, guanidine, biuret, dicyandiamide, melamine and the like, and as alcohols which are substantially immiscible with water there are to be understood alcohols such as butyl alcohol, amyl alcohol, hexyl alcohol, cyclohexanol, benzyl alcohol and the like.

The hardenable condensates themselves are obtained in known manner by the simultaneous condensation of the aforesaid components with formaldehyde or by preparing the methylol compounds of the substances of amide character and etherifying the methylol compounds with the alcohols. In both cases the alcohol which is not consumed by etherification serves as solvent for the condensate, so that solutions of the condensates are obtained which can be used directly. Instead of or in addition to using an excess of the alcohol another solvent suitable for the invention may be used for dissolving the condensate.

As hydrotropic carbamides capable of forming hardenable aminoplasts with formaldehyde there are suitable urea or thiourea or mixtures of urea and thiourea, which are used in quantities amounting, for example, in the case of casein to about 50–300 parts of the carbamide per 100 parts of casein.

According to Neuberg (Biochemische Zeitschrift, vol. 76 [1916] page 107), those readily soluble compounds of predominantly neutral reaction which have the peculiar capacity of bringing substances, which per se are insoluble, into solution with water may be termed "hydrotropic." As is known, low molecular carbamides, such as for instance urea, thiourea and monomethyl-urea possess the property of being hydrotropic, but this is not the case with the higher molecular ureas, such for example as diphenylurea, dinaphthyl urea and sulfuric acids thereof. Thus, it is possible, for instance, to dissolve casein without addition of basic substances in concentrated aqueous solutions of the aforenamed carbamides according to the invention.

Among proteins there is suitable principally acid casein. Especially homogeneous and stable emulsions are obtained by using casein which is practically free from lactalbumin and has been purified in known manner, for example, by the process of Patent No. 2,372,986.

Besides casein there may be used other soluble protein bodies such, for example, as gelatine or fish glue.

The protein is dissolved in water together with the hydrotropic carbamide and, in the case of certain proteins such as casein and the like, generally with the use of a basic substance such, for example, as sodium hydroxide, potassium hydroxide, ammonia, sodium carbonate, borax, trisodium phosphate, triethanolamine or cyclohexylamine. In all cases this protein solution forms the external aqueous phase of the emulsion, and may itself contain a wide range of additions in solution or suspension, for example, a substance capable of forming a hardenable aminoplast with formaldehyde, such as biuret, dicyandiamide, etc.

The internal oily phase contains the hardenable resin dissolved in more or less high concentration. The liquid of the oily phase consists of solvents immiscible or only partially miscible with water, such as extraction benzine, lacquer benzine, sangajol, xylene, chlorobenzene, tetralin or the like, and advantageously consists of the alcohols mentioned above.

The formation of the emulsion is carried out in the usual manner by gradually introducing the oily phase into the thoroughly agitated aqueous phase.

The emulsions which are to be subjected to drying may contain a wide range of substances which render them suitable for various purposes, and which are added to the oily internal phase, that is to say, the artificial resin solution to be dispersed, or to the external aqueous phase. Such substances are, for example, softeners such as tricresyl phosphate or glycerine, filling materials, organic or inorganic pigments, matting agents, emulsifiers, anti-foaming agents, wetting agents, hydrophobic materials such as paraffin wax or other waxes, hardening accelerators, for example ammonium thiocyanate, diethyl tartrate, buffer substances, etc. Valuable combinations can also be obtained by the addtion of further oil-soluble or water-soluble binding agents, especially artificial resins or primary condensation products thereof, and the like. Thus, for example, there may be added to the aqueous phase of the emulsions before the drying operation or after redispersing the dry preparations advantageously water-soluble etherified methylol compounds of carbamides, which also yield insoluble resins when heated at high temperatures, for example, dimethylol-urea dimethyl ether or hexamethylol melamine methyl ether.

The new dry preparations obtained by the invention from such emulsions can be easily worked up with water and, if desired, organic solvents into products of a desired pasty or salve-like consistency, which can be used for the same purposes, hereinbefore mentioned, as the emulsions of the copending application Serial No. 783,844, referred to in the opening part of this specification. Of special interest are pigmented products which are particularly suitable in the textile industry for dyeing or printing fabrics. The suitability of such preparations for dyeing or printing is determined, on the one hand, by the pigment and, on the other, by the finely divided and completely insoluble artificial resin, which is formed by subsequently hardening the dyeing or print at a temperature above 100° C. or by the action of acid steam, etc., and which fixes the pigment on the fibre. Dyeings or prints produced in this manner are in many cases distinguished by extraordinary fastness to light, washing and rubbing.

The following examples illustrate the invention, the parts being by weight:

*Example 1*

120 parts of a solution of urea-formaldehyde-butanol resin in butanol, which solution has a content of dry matter of 60 per cent. by weight, are diluted with 240 parts of monochlorobenzene. The thinly liquid lacquer so obtained is emulsified in 360 parts of an aqueous solution which contains 65 parts of pure acid casein, 8 parts of borax, 52 parts of urea, 13 parts of thiourea, 16 parts of highly sulfonated castor oil and 2 parts of disodium citrate. There are obtained 720 parts of a well dispersed salve-like emulsion which is diluted with 400 parts of water to form a milky liquid capable of forming drops.

The emulsion so obtained is worked up on an atomising dryer, and there is obtained a product which when warmed is soft and cakes to form incrustations, and which is rapidly cooled to room temperature and then ground to a fine powder. The latter can easily be dispersed with a small quantity of water to form a viscous hardenable binding agent and with a large quantity of water to form a milky liquid which is transparent in thin layers.

Example 2

300 parts of fish glue having a content of dry material of 45 per cent. are mixed with 100 parts of urea, and 200 parts of the solution of a urea-formaldehyde-butanol resin in butanol used in Example 1 are emulsified in the resulting solution. The pasty viscous emulsion is diluted with 600 parts of water.

The resulting thinly fluid milky liquid is converted into a granular powder by drying with atomisation followed by immediate cooling. The granular powder can be easily redispersed to form a viscous binding agent yielding bonds which are hardenable by heat.

Example 3

250 parts of acid casein and 200 parts of urea are dissolved in 525 parts of water with the addition of 25 parts of triethanolamine. In the viscous solution are slowly emulsified by means of an emulsifying machine 700 parts of a lacquer capable of forming drops and consisting of 290 parts of a solution in butanol or benzyl alcohol of a urea-formaldehyde resin etherified with butanol or benzyl alcohol and 410 parts of trichlorethylene.

The emulsion so obtained is dried by spraying it with hot air and then subjecting it to reduced pressure at 60° C. After grinding there is obtained a fine powder of unlimited stability which can be redispersed by stirring it with water. When heated for a few minutes at 150° C. the preparation becomes completely insoluble.

Example 4

150 parts of pure acid casein are dissolved together with 80 parts of urea, 20 parts of thiourea and 18 parts of borax in 482 parts of water. In the resulting casein solution are emulsified 170 parts of the solution of a urea-formaldehyde-butanol resin mentioned in Example 1, and the emulsion is diluted with a solution of 125 parts of dimethylol-urea dimethyl ether in 955 parts of water. There are obtained 2000 parts of a milky liquid having a content of dry material of about 25 per cent.

The resulting emulsion is worked up to a powder by drying with atomisation or by vacuum drying. The powder easily swells in water and is dispersed after a short time to form a homogeneous binding agent. Instead of dimethylol-urea - dimethyl ether, hexamethylolmelamine methyl ether may be used. The latter yields an especially good hardenable and water-resistant adhesive.

Example 5

15 parts of urea-formaldehyde - butanol resin dissolved in 10 parts of butanol are emulsified in a solution of 20 parts of gelatine, 15 parts of thiourea and 2 parts of glycerine in 63 parts of water.

The emulsion so obtained is cautiously evaporated to dryness under reduced pressure, and the resulting product is pulverized after being cooled. There is obtained a colorless powder which slowly yields a viscous hardenable binding agent with water.

Example 6

100 parts of casein, 120 parts of urea, 20 parts of dicyandiamide and 10 parts of ammonium thiocyanate are dissolved in 150 parts of water. In the resulting viscous liquid are emulsified 400 parts of a resin solution which has been prepared in known manner from urea, thiourea, formaldehyde and cyclohexanol and which consists of about 35 per cent. by weight of condensate and about 65 per cent. by weight of cyclohexanol as solvent. The emulsion is cautiously evaporated under reduced pressure to a soft viscous mass, which after cooling becomes hard and brittle and can be easily pulverized in this condition. By working it up into a paste with a small quantity of water the powder yields a viscous hardenable glue of distinctly acid reaction.

Example 7

80 parts of titanium white are triturated to a fine suspension in 120 parts of an aqueous solution containing 20 parts of pure acid casein, 16 parts of urea, 4 parts of thiourea, and 2 parts of borax or trisodium phosphate. The resulting composition is mixed with an emulsion which has been prepared by emulsifying 120 parts of an artificial resin lacquer in a further 120 parts of the same casein solution. The artificial resin lacquer may, for example, have the following composition:

| | Per cent. |
|---|---|
| Hexamethylol melamine etherified with butyl alcohol | 35 |
| Butyl alcohol | 15 |
| Benzine boiling at 100–140° C. | 50 |
| | 100 |

There are obtained 440 parts of a suspension containing pigment and melamine resin in fine dispersion, which is well stirred.

The dispersion so obtained is then evaporated to dryness under reduced pressure. After cooling, there remains a viscous white mass capable of being granulated, which can be easily dispersed in water to give a good dispersion. Artificial silk impregnated with this dispersion and then dried at a temperature above 100° C. exhibits a matt effect which is fast to washing and rubbing.

Example 8

360 parts of an aqueous solution containing 90 parts of purified acid casein free from lactalbumin, 72 parts of urea, 18 parts of thiourea and 10 parts of borax are placed in an emulsifying machine. 200 parts of the solution of a urea-formaldehyde-butanol resin in butanol described in Example 1 are slowly run in, and there is obtained a very fine salve-like emulsion which is diluted with 700 parts of water to form a milky liquid which is transparent in thin layers. This liquid is mixed with 240 parts of an aqueous pigment suspension, which contains 60 parts of a very finely divided pigment, 21 parts of acid casein, 18 parts of urea, 2.5 parts of borax and 20 parts of highly sulfonated castor oil. There may be used as a pigment, for example, the product obtained by coupling diazotized 2:5-dichloraniline with β-hydroxy-naphthoic acid ortho-anisidide.

The liquid now containing the pigment dyestuff and resin in a very fine state of suspension is dried with hot air by atomisation. There is obtained a product which is still soft and easily takes up water. This product is further dried under reduced pressure at 80–85° C. and, after cooling, is ground to a fine powder. The latter can be redispersed in water and mixed with the usual thickening agents for use as a printing color or foulard liquor. By heating, for example for 5 minutes at 150° C., a fabric treated therewith, the finely dispersed artificial resin is hardened and the pigment is fixed very fast to washing.

*Example 9*

580 parts of a pigmented lacquer containing 10 per cent. by weight of copper phthalocyanine, 50 per cent. by weight of urea-formaldehyde-butanol resin (dry substance) and 40 per cent. by weight of butanol are emulsified by means of a suitable apparatus in 900 parts of an aqueous solution containing 127.5 parts of casein, 174 parts of urea, 43.5 parts of thiourea, 6 parts of sodium hydroxide and 100 parts of a phosphate buffer mixture of 10 per cent. strength having a pH value of 6.70. There is obtained a thick well dispersed emulsion of which the internal phase is pigmented. It is diluted with 650 parts of water and then mixed with 370 parts of an aqueous pigment suspension, which contains 25 per cent. of finely dispersed copper phthalocyanine, 8.65 per cent. of casein, 0.25 per cent. of sodium hydroxide, 6 per cent. of urea, 1.5 per cent. of thiourea, and 3.2 per cent. of sulforicinoleate.

The thin paste so obtained is dried on a drum dryer. The product so obtained which still contains some water and butanol is completely freed from these solvents under reduced pressure and then pulverized. By redispersing the resulting powder a resin dispersion is obtained of which both phases contain pigment. This suspension enables larger quantities of organic solvent to be emulsified, whereby pasty products are again obtained which are suitable as printing colors for textiles. By treating a fabric printed therewith at 100° C. with dry acid steam there are obtained soft effects which are fast to washing and rubbing.

What I claim is:

1. A composition of matter comprising a powder which consists of a water-insoluble hardenable condensate of (a) formaldehyde, (b) a hardenable aminoplasts-forming substance selected from the group consisting of urea, thiourea, guanidine, biuret, dicyandiamide and melamine, and (c) a substantially water-immiscible alcohol, a soluble protein product selected from the group consisting of a soluble caseinate, gelatine and fish glue and a hydrotropic carbamide selected from the group consisting of urea and thiourea, which composition upon mixing with water yields a homogeneous dispersion.

2. A composition of matter according to claim 1, and also containing a pigment, which composition upon mixing with 1 to 2 parts of water yields a homogeneous paste which is suitable for the printing of textiles.

3. A composition of matter comprising a powder which consists of a water-insoluble hardenable condensate of (a) formaldehyde, (b) a hardenable aminoplasts-forming substance selected from the group consisting of urea, thiourea, guanidine, biuret, dicyandiamide and melamine, and (c) a substantially water-immiscible alcohol, a soluble caseinate and a hydrotropic carbamide selected from the group consisting of urea and thiourea, which composition upon mixing with water yields a homogeneous dispersion.

4. A composition of matter comprising a powder which consists of a water-insoluble hardenable condensate of (a) formaldehyde, (b) urea, and (c) a substantially water-immiscible alcohol, a soluble caseinate and a hydrotropic carbamide selected from the group consisting of urea and thiourea, which composition upon mixing with water yields a homogeneous dispersion.

5. A composition of matter comprising a powder which consists of a water-insoluble hardenable condensate of (a) formaldehyde, (b) melamine, and (c) a substantially water-immiscible alcohol, a soluble caseinate and a hydrotropic carbamide selected from the group consisting of urea and thiourea, which composition upon mixing with water yields a homogeneous dispersion.

6. A composition of matter comprising a powder which consists of a water-insoluble hardenable condensate of (a) formaldehyde, (b) a mixture of urea and thiourea, and (c) a substantially water-immiscible alcohol, a soluble caseinate and a hydrotropic carbamide selected from the group consisting of urea and thiourea, which composition upon mixing with water yields a homogeneous dispersion.

7. A composition of matter according to claim 3, and also containing a pigment, which composition upon mixing with water yields a homogeneous paste which is suitable for the printing of textiles.

8. A composition of matter according to claim 4, and also containing a pigment, which composition upon mixing with water yields a homogeneous paste which is suitable for the printing of textiles.

9. A composition of matter according to claim 5, and also containing a pigment, which composition upon mixing with water yields a homogeneous paste which is suitable for the printing of textiles.

LUZIUS SCHIBLER.

REFERENCES CITED

The following references are of record in the file of this patent:

UNITED STATES PATENTS

| Number | Name | Date |
|---|---|---|
| 1,725,805 | Landecker | Aug. 27, 1929 |
| 2,133,335 | Wilson et al. | Oct. 18, 1938 |
| 2,192,129 | Ellis | Feb. 27, 1940 |
| 2,245,491 | Menger | June 10, 1941 |
| 2,250,346 | Barrell | July 22, 1941 |
| 2,290,794 | Alvarado et al. | July 21, 1942 |
| 2,318,121 | Widmer | May 4, 1943 |
| 2,334,096 | Howald et al. | Nov. 9, 1943 |
| 2,356,794 | Peiker | Aug. 29, 1944 |
| 2,361,277 | Enderlin et al. | Oct. 24, 1944 |

OTHER REFERENCES

Neuberg, Biochem. Zeitschr., vol. 76, 1916 page 107.